(12) United States Patent
Demerly

(10) Patent No.: US 6,808,041 B2
(45) Date of Patent: Oct. 26, 2004

(54) METHOD AND SYSTEM FOR PROVIDING SECONDARY VEHICLE DIRECTIONAL CONTROL THROUGH BRAKING

(75) Inventor: Jon D. Demerly, Byron, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/202,760

(22) Filed: Jul. 25, 2002

(65) Prior Publication Data

US 2002/0189889 A1 Dec. 19, 2002

Related U.S. Application Data

(63) Continuation-in-part of application No. 09/781,678, filed on Feb. 12, 2001, now Pat. No. 6,719,087.
(60) Provisional application No. 60/181,972, filed on Feb. 11, 2000, and provisional application No. 60/225,095, filed on Aug. 14, 2000.

(51) Int. Cl.[7] .................................................. B62D 5/04
(52) U.S. Cl. ......................... 180/407; 180/402; 701/43
(58) Field of Search ................................ 180/402, 407, 180/405, 406; 701/41, 43

(56) References Cited

U.S. PATENT DOCUMENTS

| | | | |
|---|---|---|---|
| 4,811,969 A | 3/1989 | Sugiyama | 280/701 |
| 4,998,593 A | 3/1991 | Karnopp et al. | |
| 5,068,584 A * | 11/1991 | Herent et al. | 318/549 |
| 5,136,507 A * | 8/1992 | Shiraishi et al. | 701/41 |
| 5,143,400 A | 9/1992 | Miller et al. | 280/661 |
| 5,251,135 A | 10/1993 | Serizawa et al. | 364/424.05 |
| 5,257,191 A * | 10/1993 | Takehara et al. | 701/43 |
| 5,335,979 A * | 8/1994 | Naitou et al. | 303/191 |
| 5,344,224 A * | 9/1994 | Yasuno | 303/146 |
| 5,448,480 A * | 9/1995 | Rauner et al. | 701/43 |
| 5,653,304 A | 8/1997 | Renfroe | 180/402 |
| 6,012,541 A * | 1/2000 | Nishioka et al. | 180/404 |
| 6,279,674 B1 * | 8/2001 | Lissel et al. | 180/402 |
| 6,363,305 B1 | 3/2002 | Kaufmann et al. | 701/41 |
| 6,370,460 B1 | 4/2002 | Kaufmann et al. | 701/41 |
| 6,453,226 B1 | 9/2002 | Hac et al. | |
| 6,499,559 B2 | 12/2002 | McCann et al. | |
| 6,519,518 B1 | 2/2003 | Klein et al. | |
| 6,546,324 B1 | 4/2003 | Chen et al. | |
| 6,615,124 B1 * | 9/2003 | Adachi | 701/70 |
| 2001/0032748 A1 | 10/2001 | Demerly | |

FOREIGN PATENT DOCUMENTS

| | | |
|---|---|---|
| EP | 0 999 117 A | 5/2000 |
| JP | 3-178880 | 8/1991 |
| JP | 4-345515 | 12/1992 |
| JP | 5-77626 | 3/1993 |
| JP | 5-139138 | 6/1993 |
| JP | 2000 052955 | 2/2000 |

* cited by examiner

Primary Examiner—Avraham Lerner
(74) Attorney, Agent, or Firm—Michael D. Smith

(57) ABSTRACT

A method for implementing directional control of a motor vehicle is disclosed. In an exemplary embodiment, the method includes determining whether a failure of a primary steering system of the motor vehicle exists. If a failure of the primary steering system exists, then a yaw moment is created on the vehicle by causing a differential longitudinal force to be applied with respect to a first wheel on one side of the vehicle and a second wheel on an opposite side of the vehicle, thereby causing the vehicle to turn in a commanded direction.

8 Claims, 16 Drawing Sheets

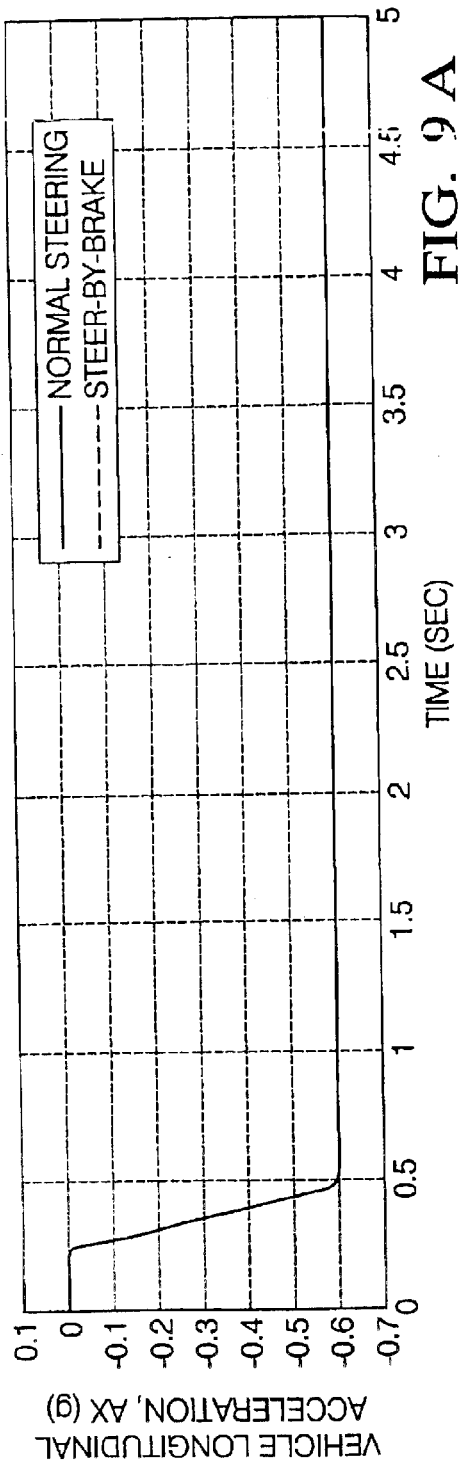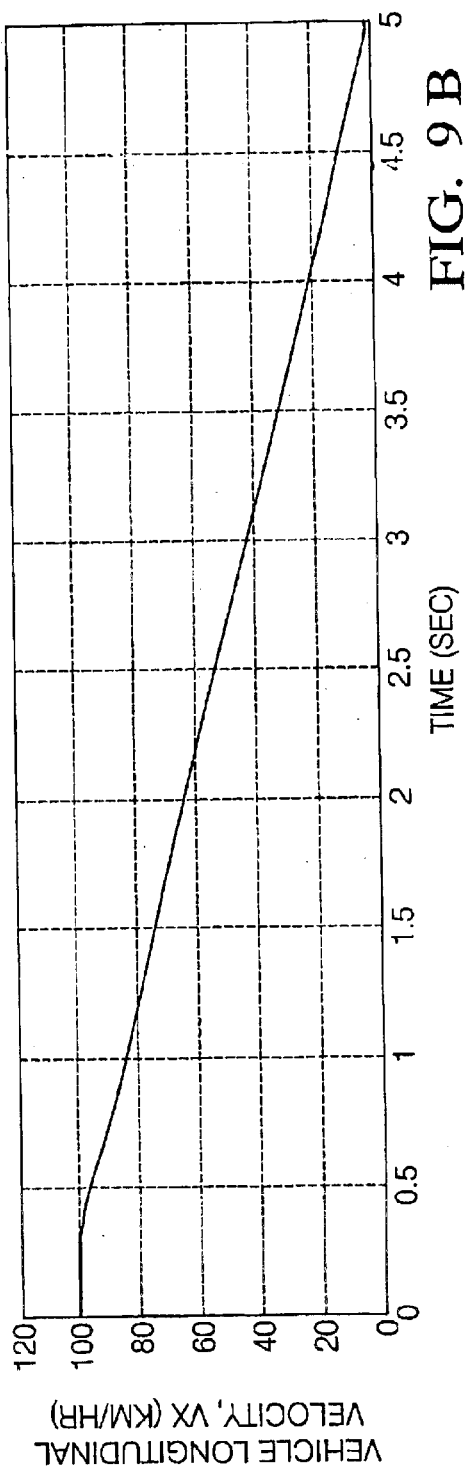

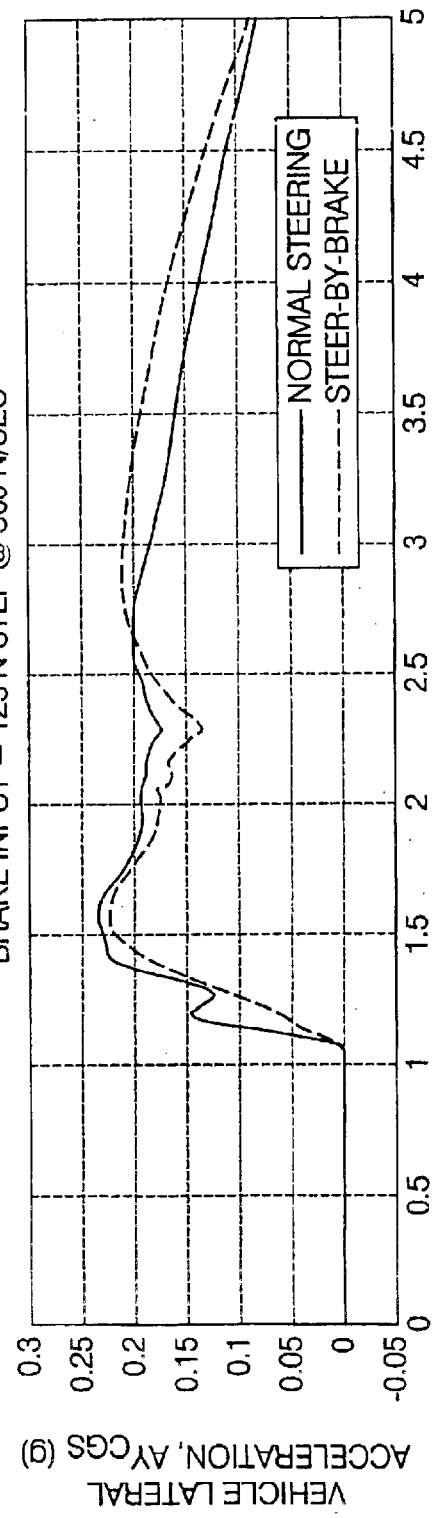
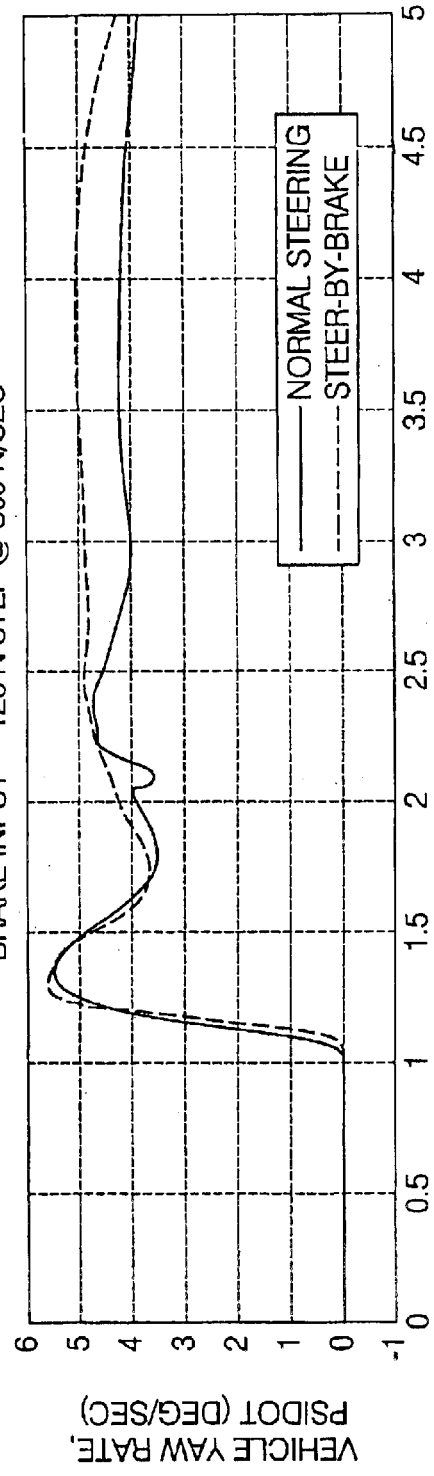

METHOD AND SYSTEM FOR PROVIDING SECONDARY VEHICLE DIRECTIONAL CONTROL THROUGH BRAKING

CROSS REFERENCE TO RELATED APPLICATIONS

This application is a continuation-in-part of U.S. application Ser. No. 09/781,678 filed Feb. 12, 2001, now U.S. Pat. No. 6,719,087 which in turn claims the benefit of an earlier filing date from U.S. Provisional Application No. 60/181,972 filed Feb. 11, 2000, and U.S. Provisional Application No. 60/225,095 filed Aug. 14, 2000, each of which are incorporated herein by reference.

BACKGROUND

The present disclosure relates generally to automobile steering systems and, more particularly, to a method and system for providing secondary vehicle directional control through the application of controlled braking applied to one or more wheels of the vehicle.

Traditionally, steering systems and braking systems for motor vehicles have each relied on the independent actuation of groups of components within the motor vehicle. Each component group actuated typically has a single function by which control of the motor vehicle is maintained. For example, with respect to steering systems, at least the front steerable wheels have been traditionally mechanically linked together and are synchronously steerable. In systems utilizing four-wheel steering, the front wheels are typically mechanically linked to each other and are synchronously steerable. The back wheels, although they are in electronic communication with the front wheels and provide an angle of steering relative to the front wheels, are likewise mechanically linked to each other and are synchronously steerable.

In the electronic braking systems currently utilized, the electronics evoke a response from hydraulic systems that apply the braking action to the wheels of the motor vehicle. During normal braking with an electronic braking system, a system computer interprets an operator input (i.e., the driver stepping on the brake pedal), and a signal is transmitted to mechanical actuators to apply the brakes. With regard to the typical vehicle configuration, the braking traditionally remains independent of the steering and the steering traditionally remains independent of the braking. When the motor vehicle experiences either function, the other remains the responsibility of the operator.

In the event of a steering system failure of a conventional steering system (short of a failure of a mechanical connection), the driver still has a measure of control over the steering. On the other hand, in a system such a "steer-by-wire" system, a failure may result in the driver losing directional control over the vehicle. While a secondary or backup steering system with redundant components and/or circuitry could be implemented to address such a possibility, the costs associated therewith dictate a less expensive, reliable alternative for a backup system to provide emergency directional control.

SUMMARY

The above discussed and other drawbacks and deficiencies of the prior art are overcome or alleviated by a method for implementing directional control of a motor vehicle. In an exemplary embodiment, the method includes determining whether a failure of a primary steering system of the motor vehicle exists. If a failure of the primary steering system exists, then a yaw moment is created on the vehicle by causing a differential longitudinal force to be applied with respect to a first wheel on one side of the vehicle and a second wheel on an opposite side of the vehicle, thereby causing the vehicle to turn in a commanded direction. The differential longitudinal force is created by applying a braking force to at least one of the first and second wheels of the vehicle.

In one embodiment, creating a yaw moment on the vehicle includes determining a desired directional response, determining whether a desired braking operation exists, and generating a brake torque output signal. Based upon the desired directional response and whether the desired braking operation exists, the brake torque output signal is used in selectively applying a braking force to at least one of the wheels of the vehicle.

Preferably, a switching mechanism is configured for selectively switching between a first, a second and a third mode of operation. The first mode of operation corresponds to an operational status of the primary steering system. The second mode of operation corresponding to a failure of the primary steering system with a commanded directional control operation of the motor vehicle. The third mode of operation corresponds to a failure of the primary steering system with a combined directional control operation and braking operation of the motor vehicle. The brake torque output signal is dependent upon which of the first, second and third modes of operation is selected by the switching mechanism.

In another embodiment, a steer-by-brake system for a motor vehicle includes a failed steering brake controller in communication with a braking system of the motor vehicle. The failed steering brake controller has a steering wheel angle as a first input thereto, a vehicle speed as a second input thereto, a vehicle yaw rate as a third input thereto, and a brake torque signal as an output therefrom. The brake torque output signal is used to selectively apply a braking force to at least one wheel of the motor vehicle when a failure of a primary steering system of the motor vehicle is detected, thereby creating a yaw moment on the motor vehicle so as to cause a turn in a commanded direction.

BRIEF DESCRIPTION OF THE DRAWINGS

Referring to the exemplary drawings wherein like elements are numbered alike in the several Figures:

FIGS. 5 through 16 are graphs illustrating various comparisons of vehicle performance between a steer-by-brake system and a normally operating steering system.

DETAILED DESCRIPTION

Disclosed herein is a method and system that provides steer-by-brake functionality in a vehicle. Broadly stated, a vehicle braking system is used to provide emergency directional control in the event of a loss of the primary steering system such as a steer-by-wire system. The backup steering function is generally accomplished in two modes or aspects. In a first aspect, directional control is provided in response to a driver steering wheel angle input. In a second aspect, combined directional control and braking is provided in response to both a steering wheel angle input and a brake pedal force input.

A steer-by-brake algorithm embodiment is thus implemented in conjunction with a system that provides for steer-by-brake functionality, and without requiring any changes in the driver's behavior. This means that the driver simply inputs steering wheel angle and brake pedal force (as is done during normal driving operations), and the algorithm then determines the appropriate control responses. Preferably, to prevent a driver from over-compensating or responding inappropriately, the transitions between different modes of operation should be as smooth as possible.

Directional Control

In the directional control mode mentioned above, the application of a braking force to a single front wheel is a preferred method for achieving appropriate lateral response. Although applying both brakes on one side of the vehicle could also be used to achieve even greater lateral response, doing so would also result in greater undesired deceleration as well as reduced lateral stability. In order to implement the desired directional response to driver command, a closed-loop yaw rate control is utilized. However, other stability control systems, such as those including some form of sideslip or lateral acceleration, could also be used for providing desired response to driver command.

The first step implemented in providing secondary directional control was to select a method for determining driver intent. In the present embodiments, the driver intent was determined by running numerous simulations showing the relationship between steering wheel angle, vehicle speed and yaw rate, with the steering system operating normally. The results of these simulations are summarized in FIG. 1 for vehicle speeds from 20 to 160 kph, and for steering wheel angles from 15 to 180 degrees. Once determined, a "normal" steering performance may then be used to generate a control signal for a desired yaw rate of the vehicle by configuring the simulation information into a 2-D lookup table. A desired yaw rate input taken from the lookup table is then compared against the actual vehicle yaw rate, and the error therebetween is used to make adjustments to the brake torque applied.

Figure 1:
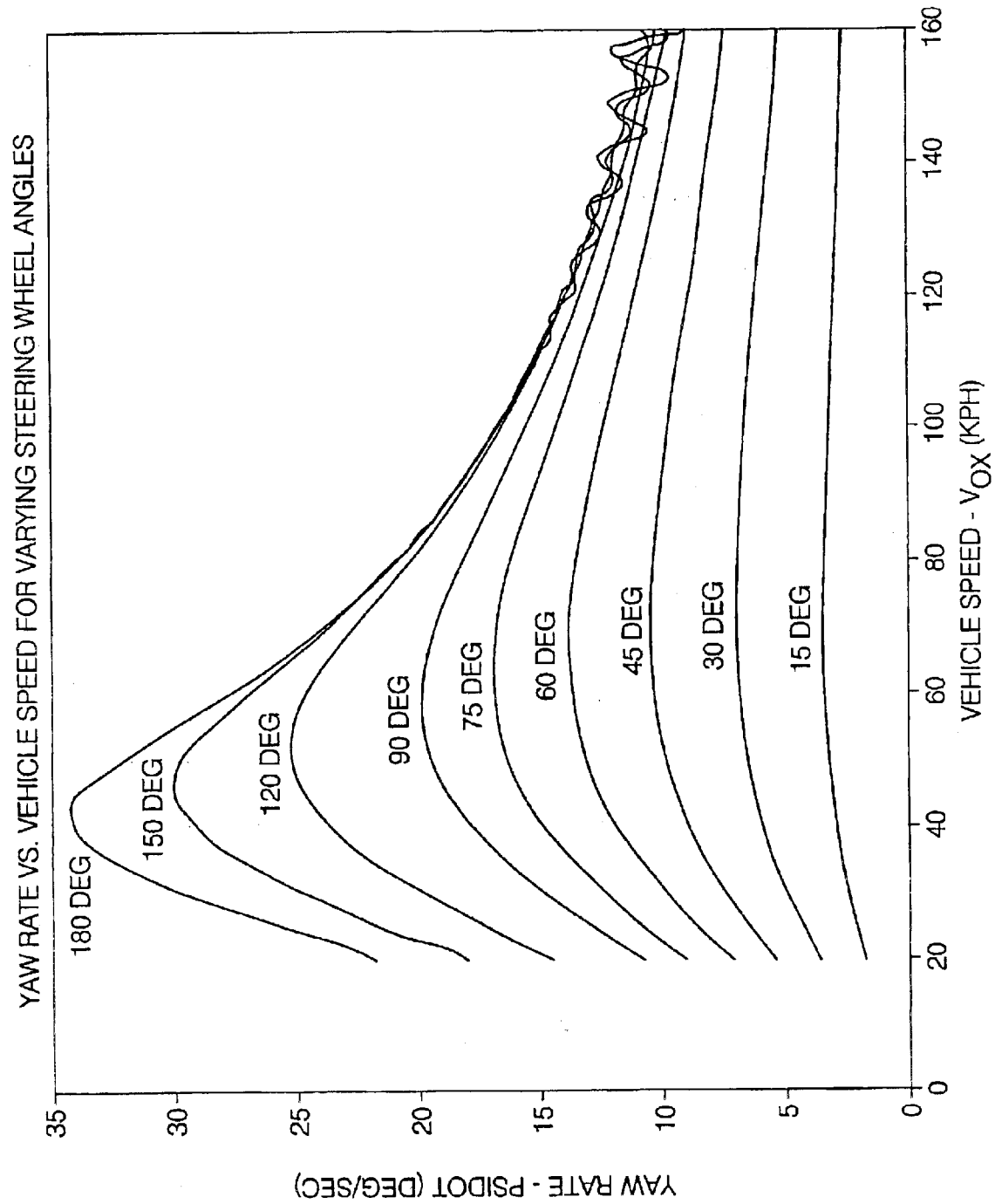
FIG. 1 is a graph illustrating vehicle test simulation results for yaw rate vs. vehicle speed for a variety of steering wheel angles.

It should be noted that the simulation results shown in FIG. 1 are based upon the steady state values of yaw rate. Since the actual vehicle response resembles a second-order system, the steady state yaw rate is first run through a second order filter in order to more closely resemble the performance with normal steering. The values for the second order filter are determined from the response of the vehicle with normal steering control.

Figure 2:
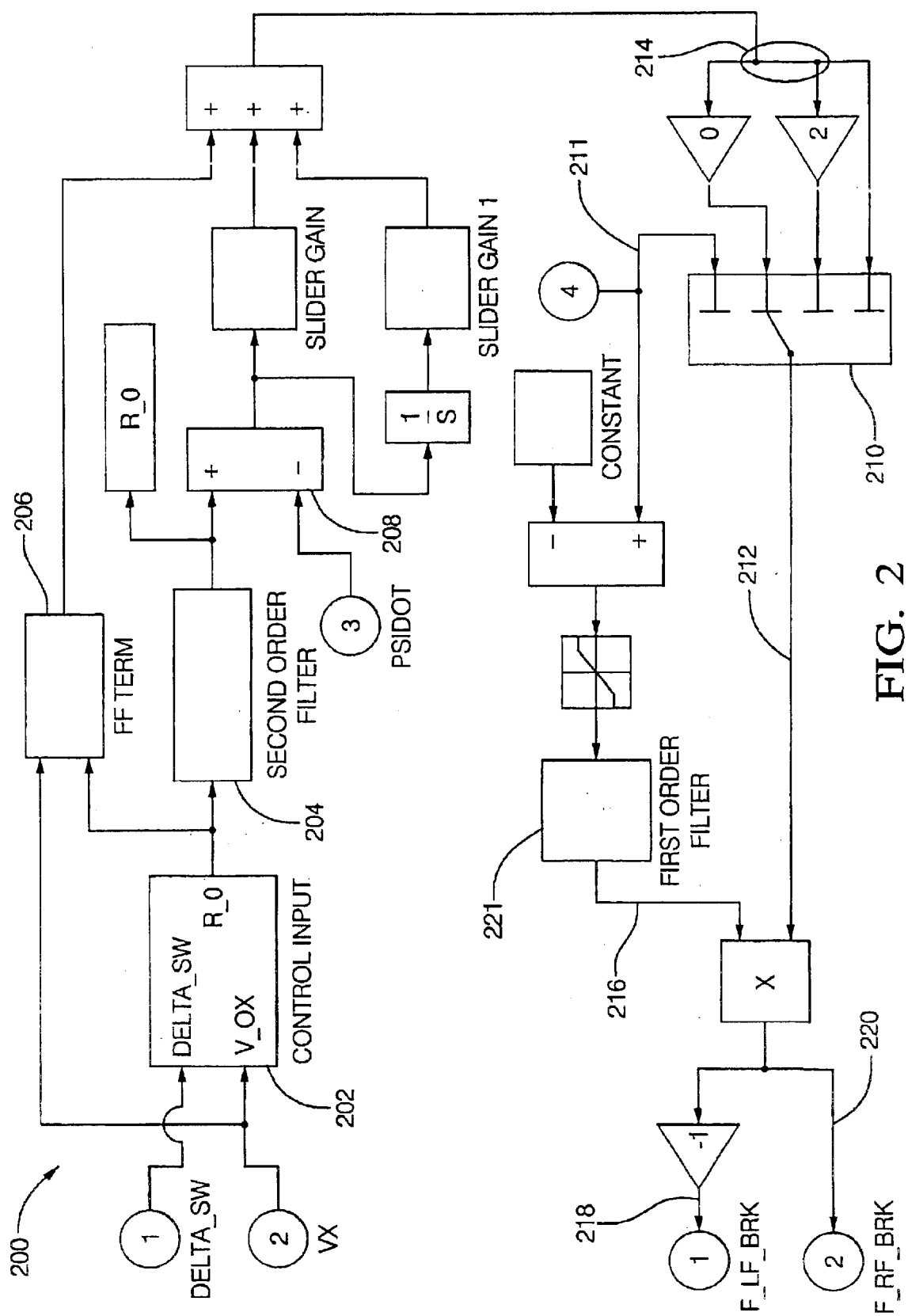
FIG. 2 is a system block diagram that illustrates the operation of a directional control algorithm implemented within a Failed Steering Brake Controller (FSBC), in accordance with an embodiment of the invention.

Referring now to FIG. 2, there is shown a system block diagram that illustrates the operation of a directional control algorithm implemented within a Failed Steering Brake Controller (FSBC) 200. As discussed, a look up table 202 is used to derive a desired steady state yaw rate, based upon the two inputs thereto (i.e., the steering wheel angle and the vehicle speed). The steering wheel angle is shown in FIG. 2 as input (1) to the FSBC 200, and the vehicle speed is shown as input (2) to the FSBC 200. Again, the output from lookup table 202 is passed through a second order filter 204, the output of which is then inputted to summation block 206, which takes the difference between the desired yaw rate and the actual yaw rate of the vehicle (input (3) to the FSBC) to produce an error signal. A feedforward term 208 is also used to provide the initial brake input required to apply the desired yaw moment to the vehicle. A closed-loop yaw rate control within the FSBC 200 then makes corrections from that point in order to achieve the desired yaw rate.

As vehicle speed changes, the relative contribution of longitudinal force versus lateral force and tire aligning moment on total kingpin moment also changes. In order to compensate for this change, the feedforward term 208 is configured to be a function of vehicle speed, as is shown in FIG. 2. One way of deriving the feedforward term 208 is to multiply a feedforward gain by a scaling factor, with the scaling factor being determined by the vehicle speed. The scaling factor, in turn, may be determined by an experimentally generated function.

Alternatively, an analysis could be conducted to determine the brake torque needed at a given speed to achieve a desired yaw rate. This information could then be used to populate a corresponding 2-D lookup table for brake torque as a function of vehicle speed and yaw rate. Such a lookup table would inherently incorporate the impact of vehicle speed on kingpin moments, and thus would eliminate the need for the gain as a function of speed. However, to fully populate such a table would require either a very large number of simulations or an extensive amount of analysis.

Still another alternative is to conduct a more thorough analysis whereby the total yaw moment acting on the vehicle for a given yaw rate is determined. From this total yaw moment, the individual contributions of the longitudinal force due to braking and the lateral force due to the wheels being steered could then be determined. This information could then be used in a lookup table or some other method of determining the needed initial brake torque. However, since this would also be a complicated and lengthy process, a process of simply tuning the gain function to get the desired response is preferred.

Combined Braking and Directional Control

When the driver is commanding both vehicle deceleration and lateral response, a different approach is taken to provide the desired response to the driver inputs. Although this could be accomplished by simply releasing one of the front brakes during such a maneuver, there would also be a resulting reduction in braking force, and therefore a decrease in the level of deceleration. Thus, in order to maintain deceleration at a level as close as possible to that under normal braking, a different approach is taken wherein the command from the closed-loop yaw rate control is used to increase the braking on one front wheel and decrease braking on the other front wheel by the same amount. The end result is that, short of wheel lockup or ABS activation, the total longitudinal force provided is nearly identical and the deceleration remains unchanged.

Steer-by-Brake Transitions

Finally, a transitional process is used to smoothly manage the transition between the various modes of operation in a steer-by-brake system. As discussed above, the steer-by-brake system has three basic modes of operation. The first mode would be normal operation of the brake system with no input from the steering. The second mode would be steering input only, and the third mode would be combined braking and steering, as described above. Referring once again to FIG. 2, a multiport switch 210 is used to select between the three modes, based upon a braking mode output signal 211 (shown as input (4) in FIG. 2) from a steer-by-brake transition block, described hereinafter.

In the first mode, the brake torque output signal 212 generated by the FSBC 200 is set to zero for normal operation. In the second mode, the brake torque output signal 212 is determined by multiplying the closed-loop yaw rate control output 214 by a factor of two. This multiplication by a factor of two is used since it takes twice the brake input on a single wheel to get the same left versus right differential braking as would be achieved by reducing the applied force on one wheel and increasing the force on the other wheel by the same amount. In the third mode, the brake torque output signal 212 is simply the closed-loop yaw rate control output 214. The brake torque output signal 212 is then multiplied by a filtered signal 216 to produce output signals 218, 220 for the left and right front brake calipers, respectively. As will be illustrated in greater detail later, the filtered signal 216 is derived from a first order filter 221 and used to facilitate a smoother transition from a normal operation to a steer-by-brake operation.

Figure 3:
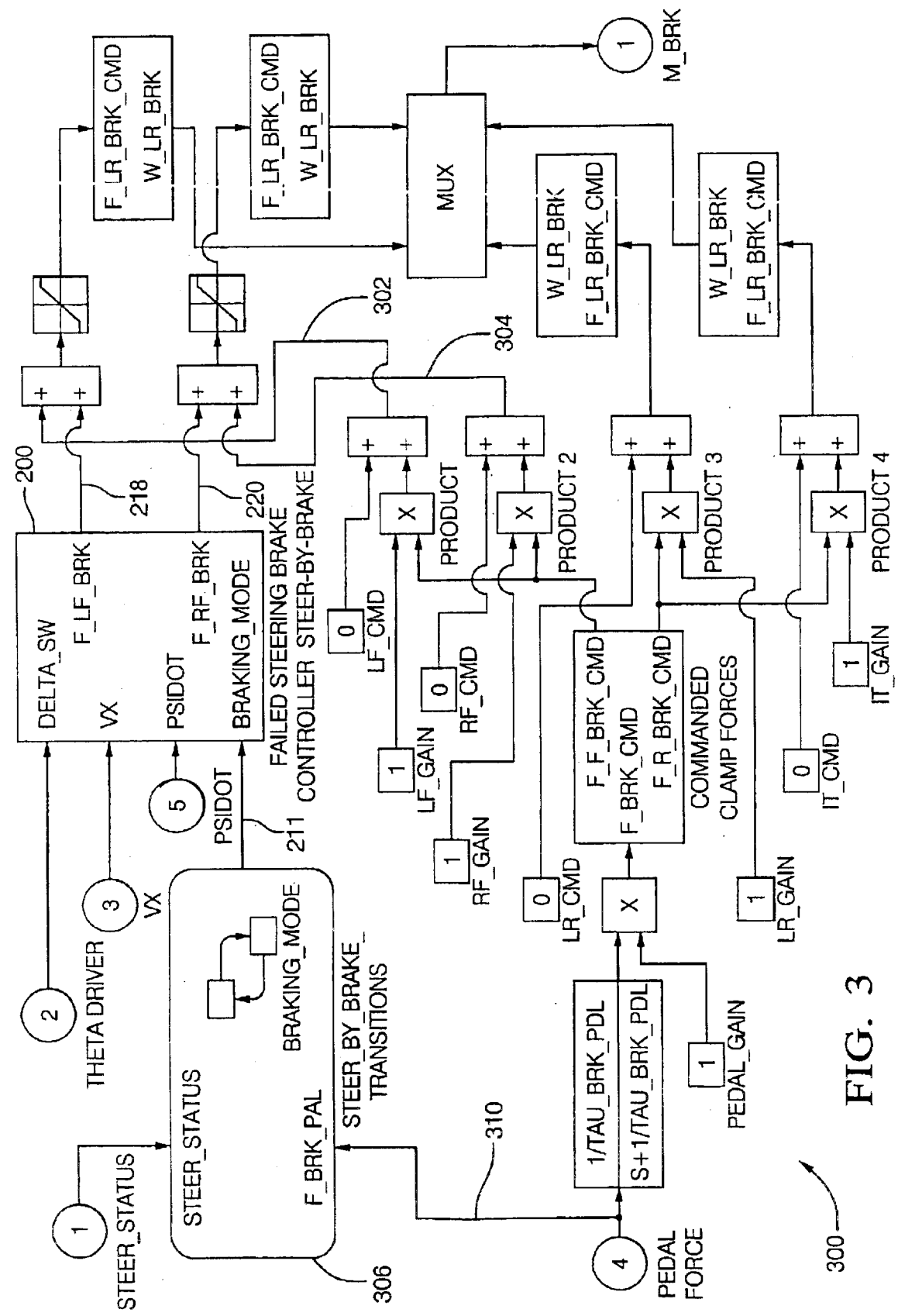
FIG. 3 is a block diagram that illustrates the FSBC of FIG. 2 and a steer-by-brake transition block incorporated into an electronic, brake-by-wire system.

FIG. 3 illustrates the FSBC 200 incorporated into an electronic, brake-by-wire system 300. Although a brake-by-wire system is depicted, this is by way of example only. It will be appreciated that the invention embodiments are equally applicable to any braking system having the capability of applying a braking force to an individual wheel, independent from a driver pedal input. As can be seen in FIG. 3, the outputs 218 and 220 from the FSBC 200 are added to the normal brake inputs 302, 304, respectively, for the front calipers. The normal brake inputs 302, 304 for the front calipers are based on the driver inputted brake pedal force to determine the total desired clamping force from the caliper. This result is limited to be a positive number and becomes the command for the individual brake calipers. Accordingly, during normal, "brake-only" operation, the applied brake torque is determined solely by the input brake pedal force. During an emergency steer-only operation (i.e., a loss of the primary steering system without braking), the resulting brake torque is determined solely by the FSBC 200. During an emergency steering operation with braking force applied, the resulting brake torque is a combination of both the input brake pedal force and the FSBC 200.

As stated earlier, a steer-by-brake transition block 306 is used to generate the braking mode output signal 211 applied to the FSBC 200. As shown in FIG. 3, the resulting one of three possible braking modes described (mode 1=normal steering operation; mode 2=failed steering, no brake applied; mode 3=failed steering, braking applied) is dependent upon a steer status signal 308 (i.e., steering normal or steering failure) and the applied brake pedal input signal 310.

Figure 4:
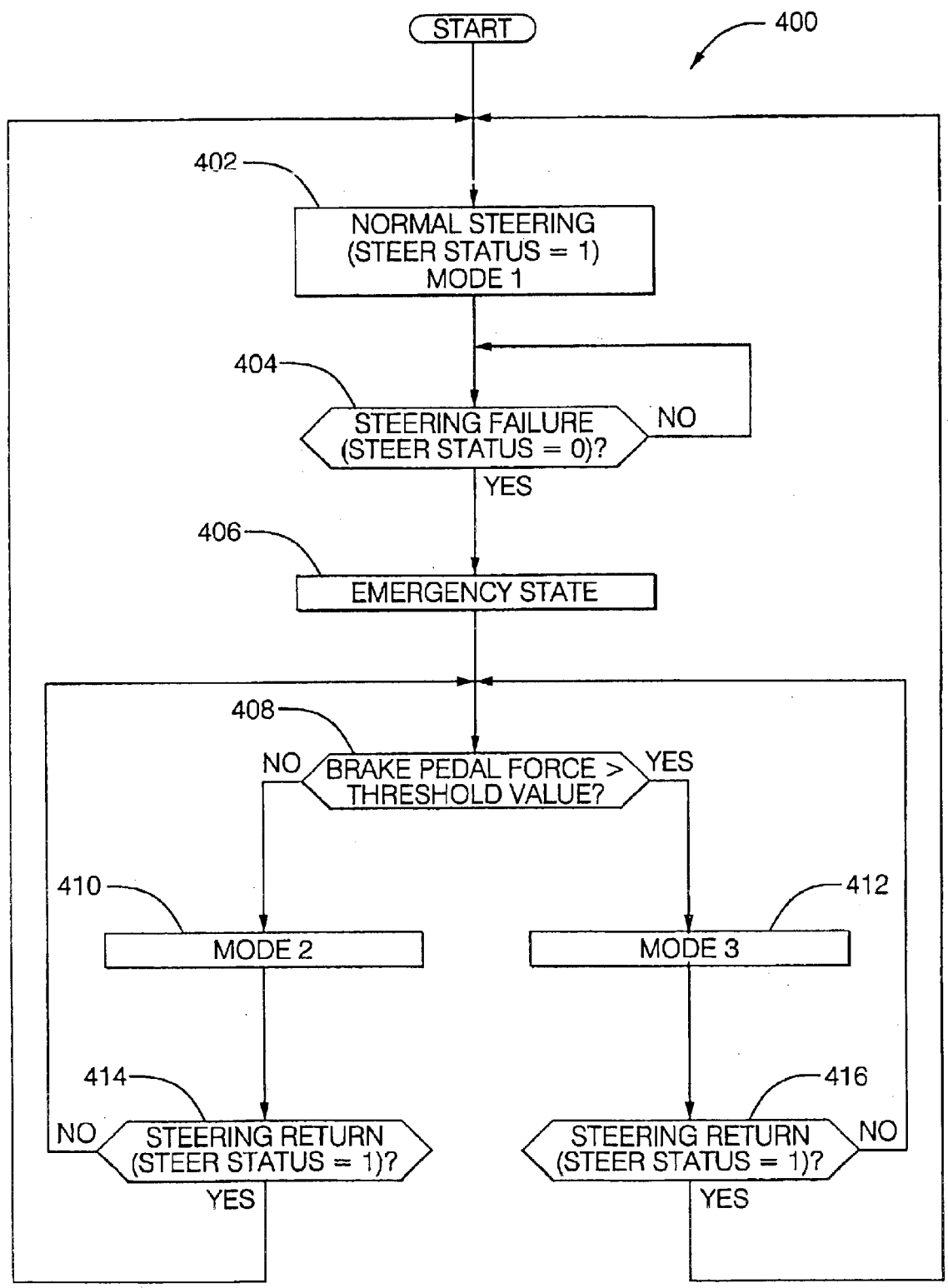
FIG. 4 is a flow diagram illustrating the logical process used by the steer-by-brake transition block shown in FIG. 3.

FIG. 4 is a flow diagram 400 that illustrates the logical process applied by the steer-by-brake transition block 306. As shown at block 402, the default braking mode is set to mode 1 (i.e., normal steering operation). At decision block 404, it is determined whether the steering status is normal; that is, so long as the variable "steer_status" remains equal to 1, normal operation continues. However, if steer_status changes to 0, as may be determined through a suitable diagnostic process, the system transitions to an emergency state at block 406. Within the emergency state, the particular mode selected depends upon the level of brake pedal force. Thus, at decision block 408, if the brake pedal force is below some threshold value (no braking input by the vehicle operator), then mode 2 is selected at block 410. However, if the brake pedal force is at or above the threshold value, then mode 3 is selected at block 412.

In addition, the steer-by-brake transition block 306 also provides for the possibility of the steering operation returning to normal (i.e., the variable steer_status returns to 1). In such a case, the system transitions back to normal operation as illustrated with decision blocks 414 and 416. If the steering operation has not returned to normal, the algorithm will continue to monitor the brake pedal force at decision block 408 in order to properly transition between modes 2 and 3, as the case may be. With regard to returning to the normal mode of operation, such a feature should be implemented with some caution, making sure that normal steering operation can actually be resumed safely.

Simulation Results

Using the above-described approach for a steer-by-brake system, simulations were conducted showing the performance thereof as compared to normal steering and braking operations. The first results illustrate the performance for the case where steer-by-brake is in operation for the entire maneuver. Additional results are also shown for the case where the steering system fails during a steering maneuver, and a transition is thus made from normal steering to steer-by-brake.

Steer-by-Brake with Steering Input Only

Figure 5A:
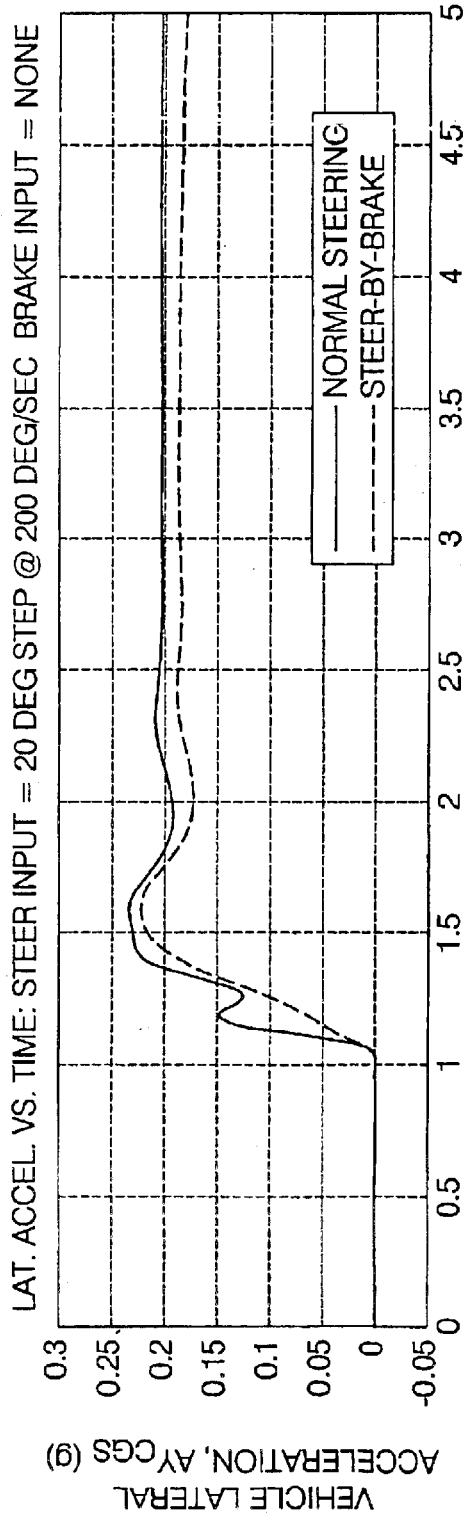
Figure 5B:
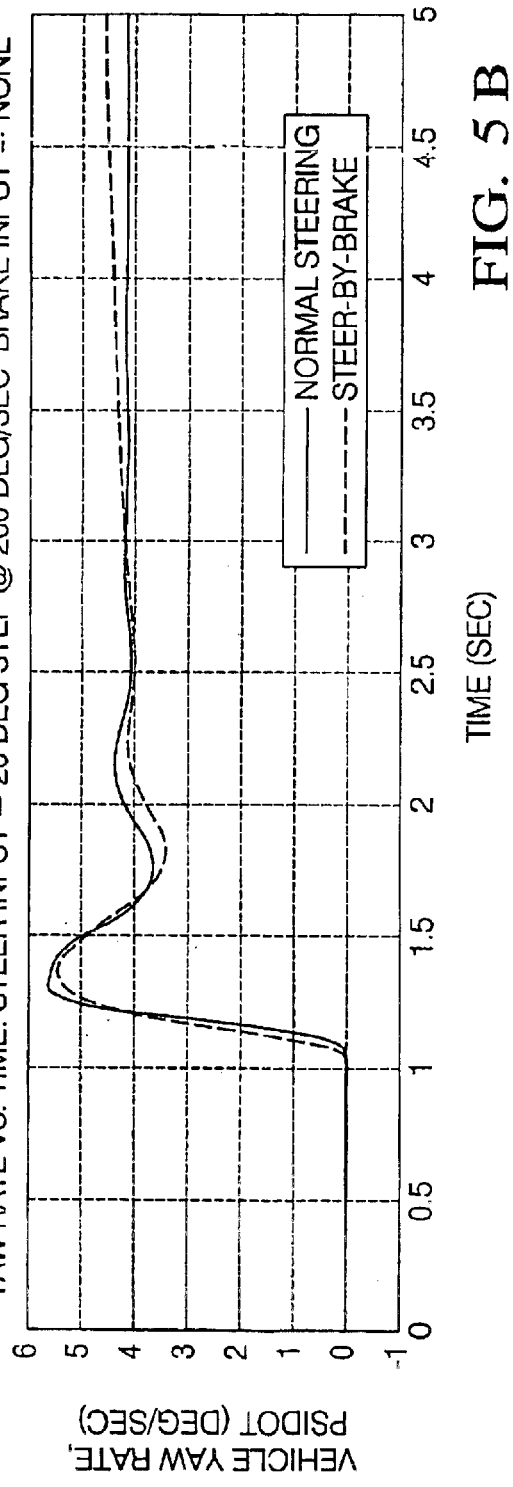
Figure 6A:
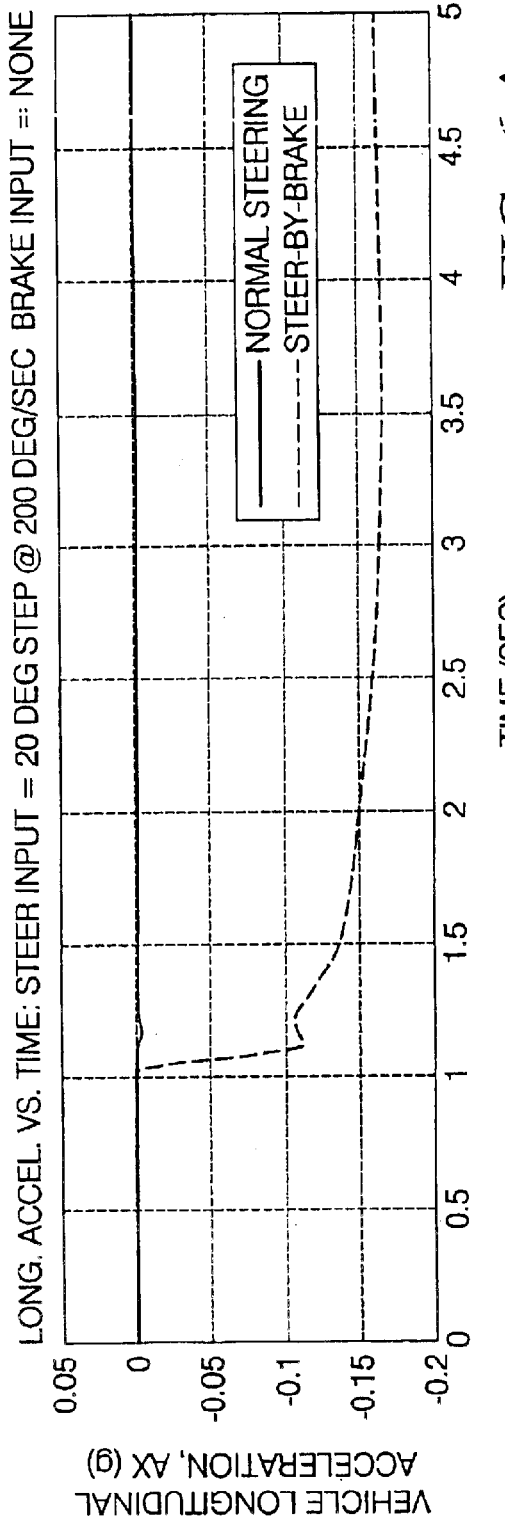
Figure 6B:
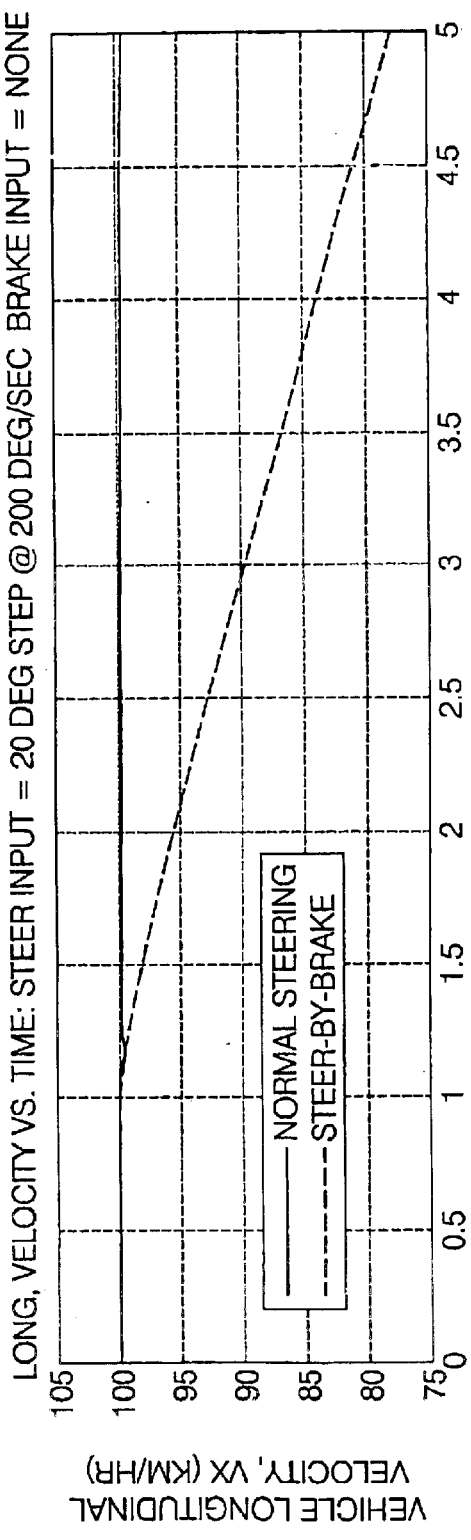

The first simulations demonstrate a comparison of system performance with steering input only (no brake pedal input). More specifically, FIGS. 5 and 6 illustrate an example of a lateral maneuver (20 degree handwheel angle step input at 200 deg/sec) executed with steer-by-brake, as compared with the same maneuver done under normal steering operation. The lateral maneuver in both instances was conducted at an initial vehicle speed of 100 kph. FIGS. 5($a$) and 5($b$) illustrate lateral acceleration and yaw rate over time, respectively, while FIGS. 6($a$) and 6($b$) illustrate longitudinal acceleration and velocity over time. As can be seen, the lateral response matches quite well as between normal steering and steer-by-brake. This is especially the case for yaw rate (FIG. 5($b$)), which is the variable being controlled.

A difference, however, is reflected in the longitudinal response shown in FIGS. 6($a$) and 6($b$). As expected, with the steer-by-brake system there is a significant level of deceleration as compared to normal steering. This deceleration and the resulting reduction in vehicle speed is what causes the yaw rate for steer-by-brake to increase with time. It will be recalled from FIG. 1 that for a starting speed of 100 kph, as vehicle speed goes down, desired yaw rate increases to a point. It is this increase in desired yaw rate caused by the vehicle slowing down that leads to the increase in yaw rate over time for steer-by-brake.

Figure 7A:
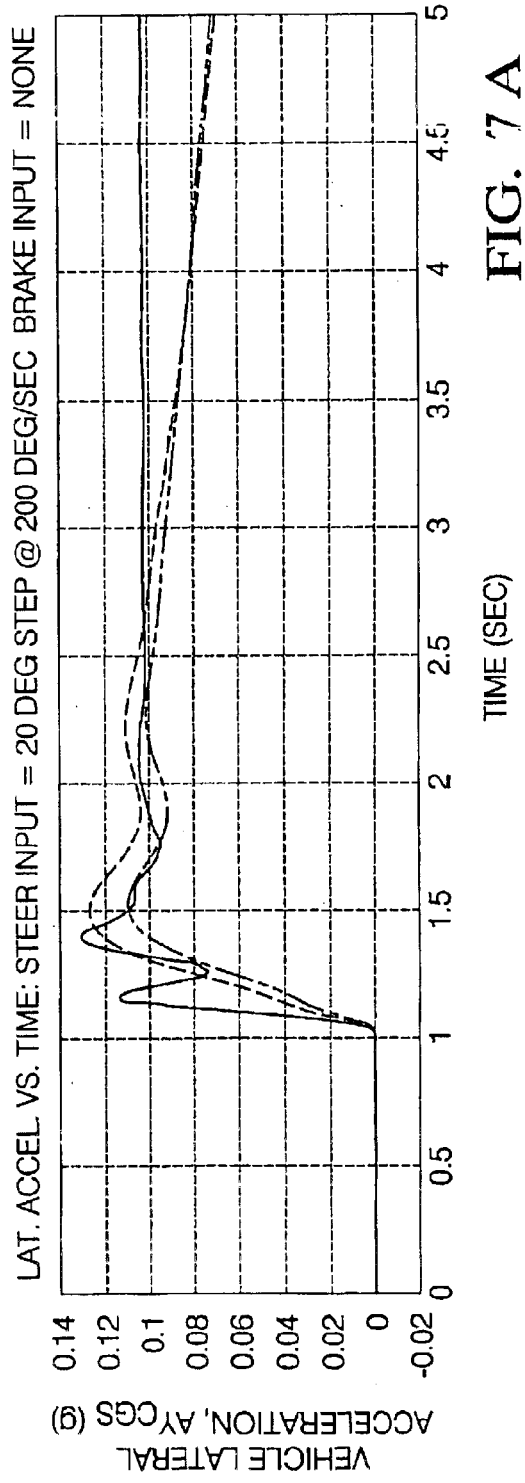
Figure 7B:
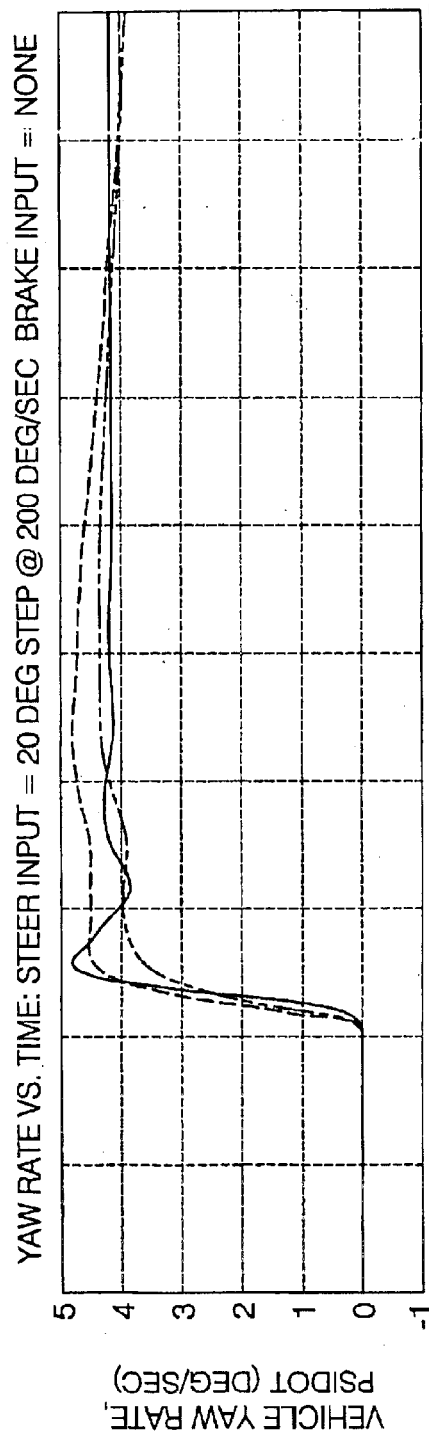

FIGS. 7($a$) and 7($b$) illustrate the lateral performance for the same maneuver conducted at an initial speed of 50 kph instead of 100 kph. These figures further illustrate, for purposes of comparison, the system performance with and without the speed compensation as provided by the feedforward term 208. The yaw rate results for steer-by-brake with speed compensation follow those for normal steering very well and are significantly better than performance without speed compensation. The difference in lateral acceleration between steer-by-brake and normal is largely caused by the reduction in vehicle speed due to the deceleration caused by steer-by-brake.

Steer-by-Brake with Combined Steering Wheel and Brake Pedal Inputs

Figure 8A:
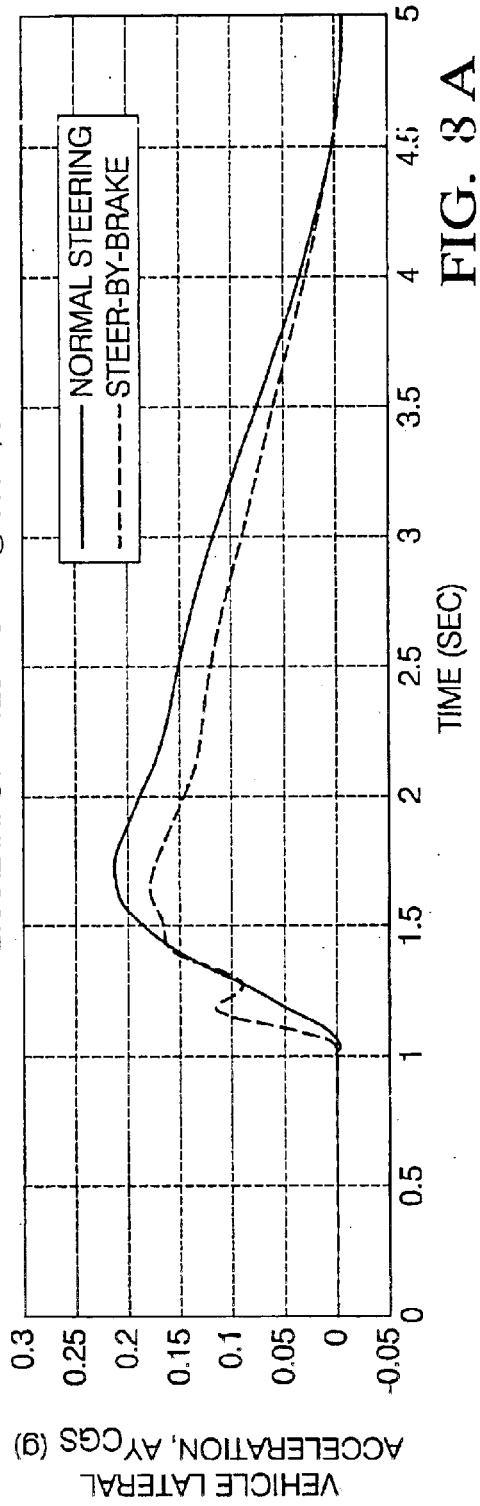
Figure 8B:
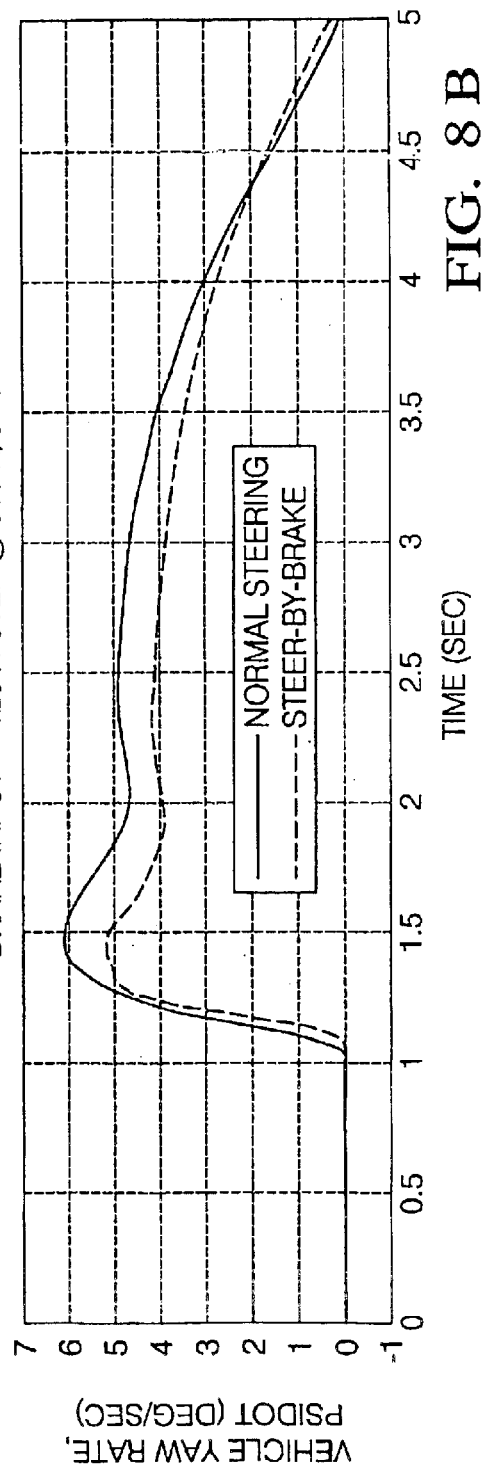
Figure 10:
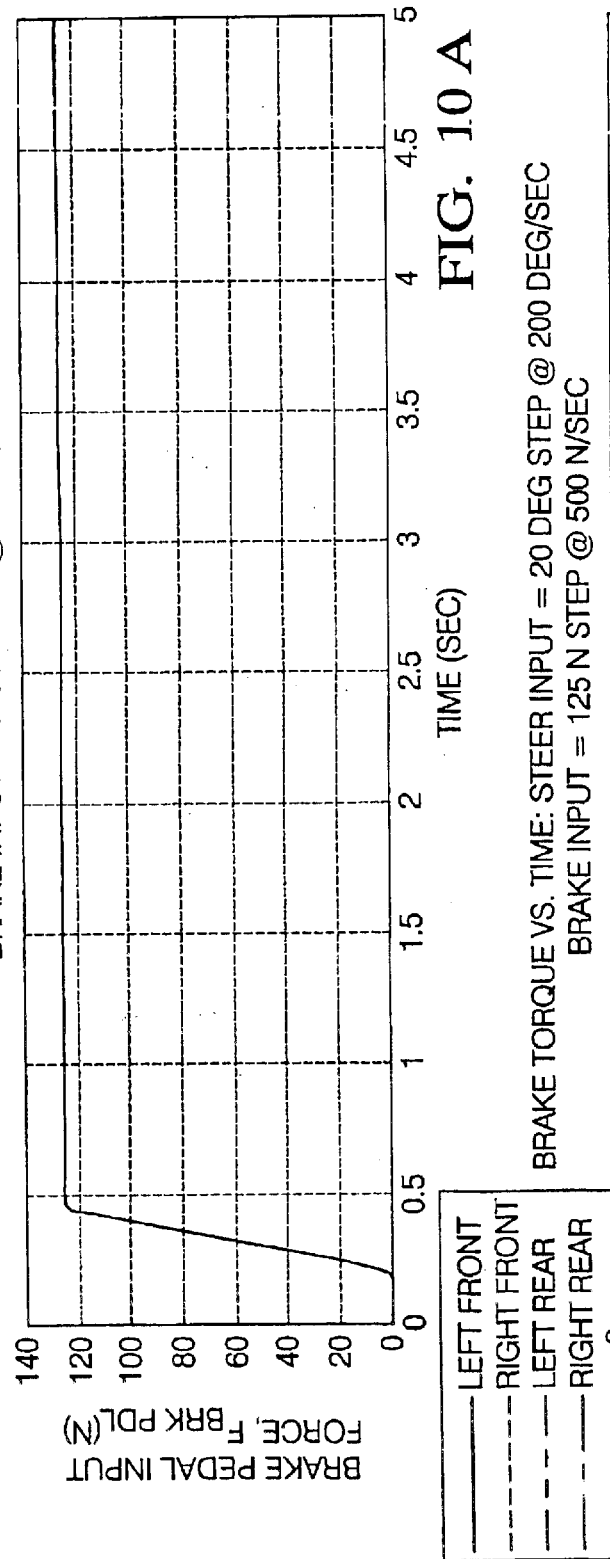
Figure 10:
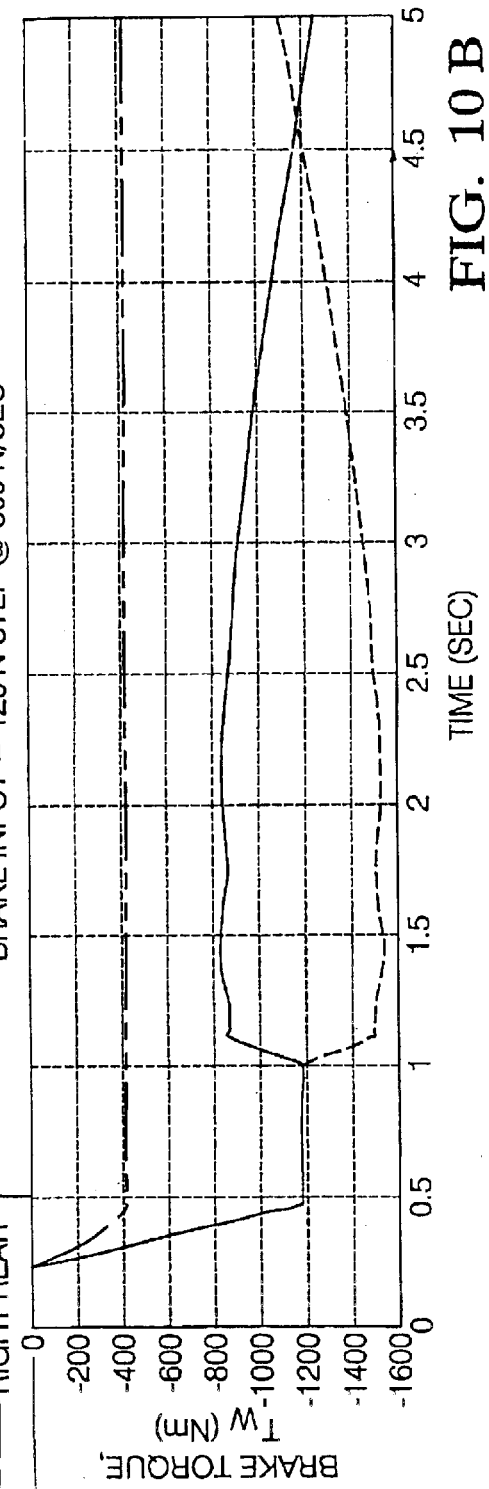

The next simulations were done in order to evaluate performance during maneuvers combining both steering wheel and brake pedal inputs. In one simulated scenario, a turning maneuver is executed during a stop (brake first then steer); in another, a braking maneuver is executed during a turn (steer first then brake). FIGS. 8, 9 and 10 illustrate the results for the first scenario, brake then steer, as between the steer-by-brake operation and a normal operation. As can be seen from the longitudinal response comparison in FIGS. 9(a) and 9(b), the performance of steer-by-brake follows that for normal operation quite well. In fact, the longitudinal response curves for steer-by-brake are virtually identical to those of normal operation, such that the two curves are indistinguishable in FIGS. 9(a) and 9(b). Thus, the steer-by-brake algorithm works very well for braking, indicating that short of reaching the maximum force capability of the tires, steer-by-brake can be conducted without a compromise in braking capability.

FIG. 10(a) illustrates the brake pedal input force over time, while FIG. 10(b) shows the specific brake torque values being applied at each wheel. During the initial straight-line braking, the left and right front wheels both receive the same brake torque. At t=1 second (when the steering input is applied) the torque on the left front wheel is reduced and the torque on the right front wheel is increased by the same amount, resulting in very little net change in deceleration. This is true even for a fairly high deceleration level of 0.6 g. For lower levels of deceleration, the lateral responses should become even closer as the magnitude of longitudinal forces is reduced.

It will be noted from FIG. 8 that the steer-by-brake system provides a greater level of lateral response than a steering system under normal operating conditions. This due to the fact that the desired yaw rate used for steer-by-brake is based upon the idealized response of the vehicle to the steering input only. When braking and steering occur together on a normally operating vehicle, both the lateral and longitudinal responses are some amount less than would be provided for steering only or braking only. This is because the force-generating capability of the tires is being shared between the lateral and longitudinal forces through the friction circle. Since the desired yaw rate used for steer-by-brake does not take this into consideration, the steer-by-brake system therefore provides a greater lateral response than for a normal operation. If desired, such an influence could be taken into consideration in the steer-by-brake algorithm.

Figure 12:
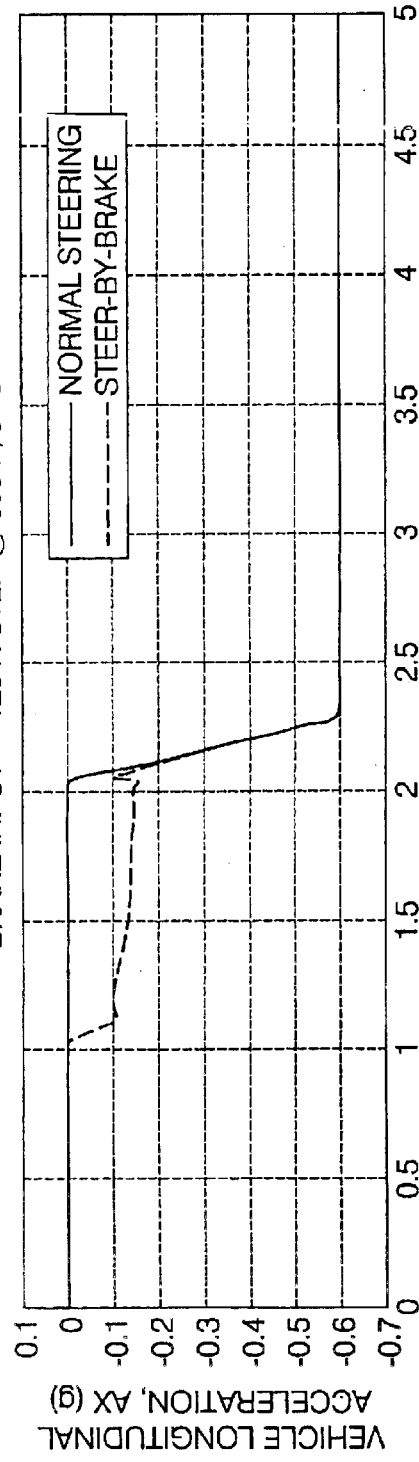
Figure 12:
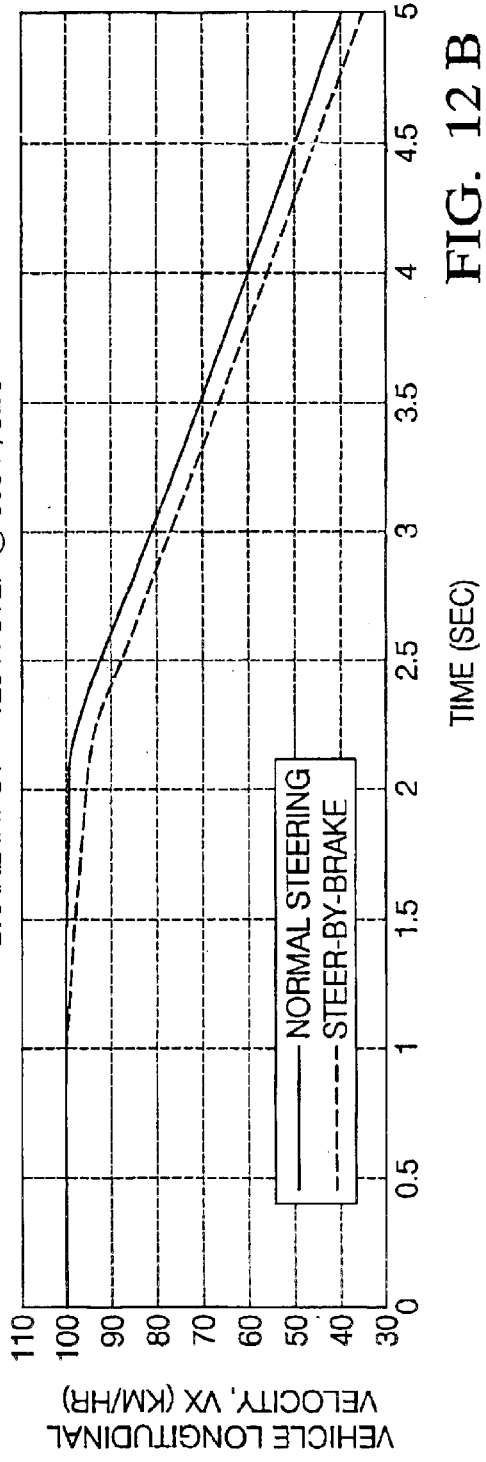
Figure 13:
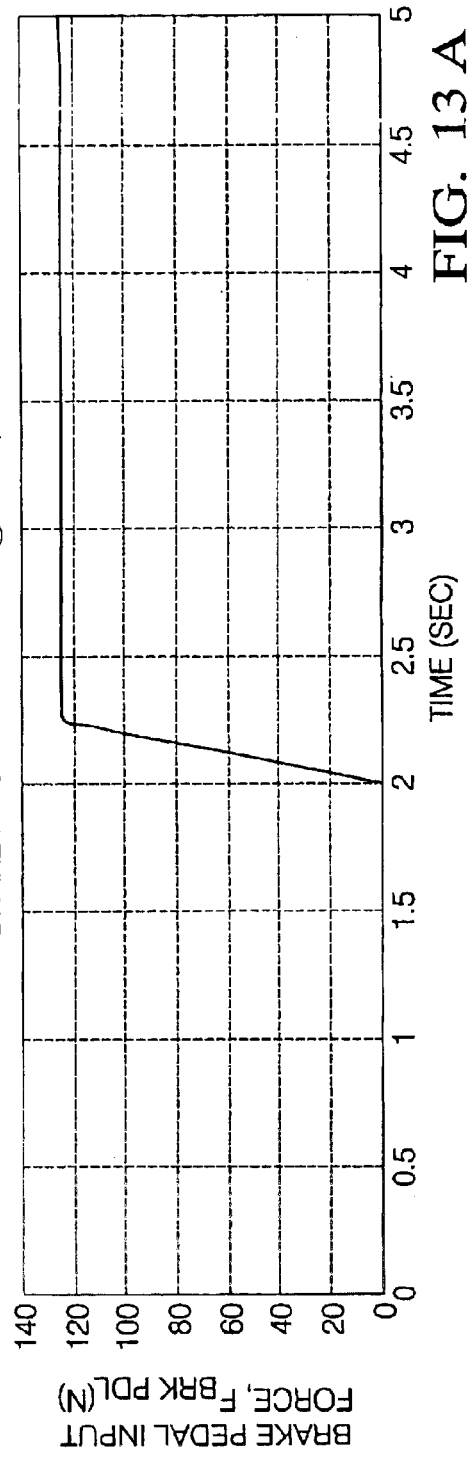
Figure 13:
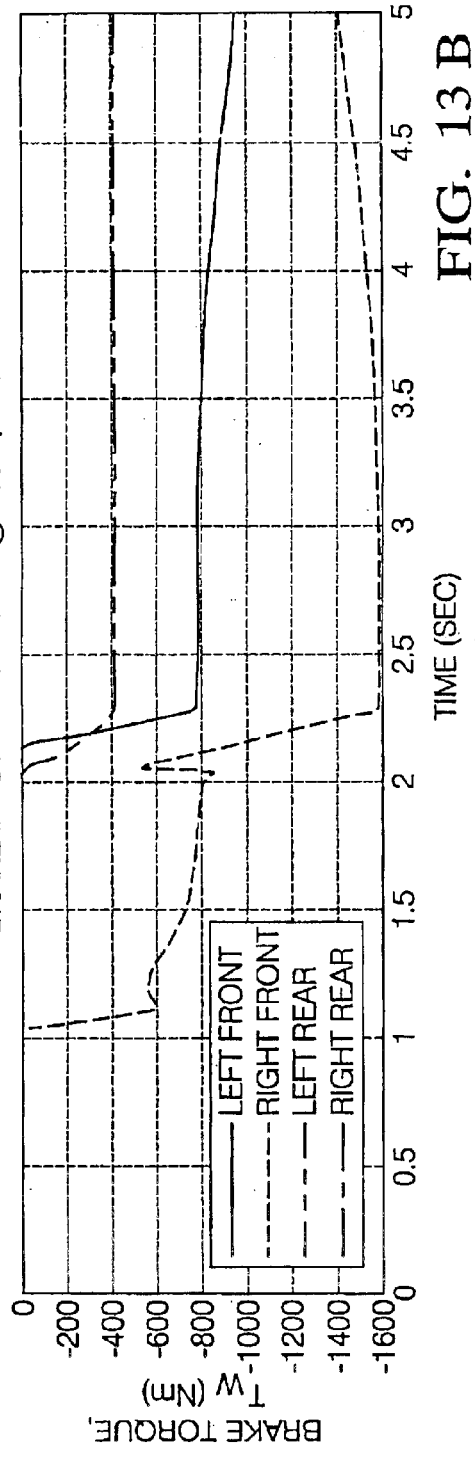

The second scenario evaluated is a braking input during a turning maneuver. In these simulations, the steering input is applied at t=1 second and the brake input at t=2 seconds. The results thereof are shown in FIGS. 11 and 12 for lateral and longitudinal response, respectively. As can be seen from FIGS. 11(a) and 11(b), the lateral acceleration and yaw rate for steer-by-brake matches very closely with the performance during normal steering. The performance differences are found mostly in the longitudinal acceleration and velocity responses illustrated in FIGS. 12(a) and 12(b). As can be seen in FIGS. 13(a) and 13(b), these longitudinal response differences result from the fact that steer-by-brake begins before there is a commanded deceleration. As such, there is an initial undesired deceleration caused by applying the right front brake that begins to slow the vehicle prior to the brake input being applied. Once the brake pedal force is applied at 2 seconds, the deceleration for steer-by-brake and normal operation converge.

Loss of Steering During a Maneuver

Figure 14:
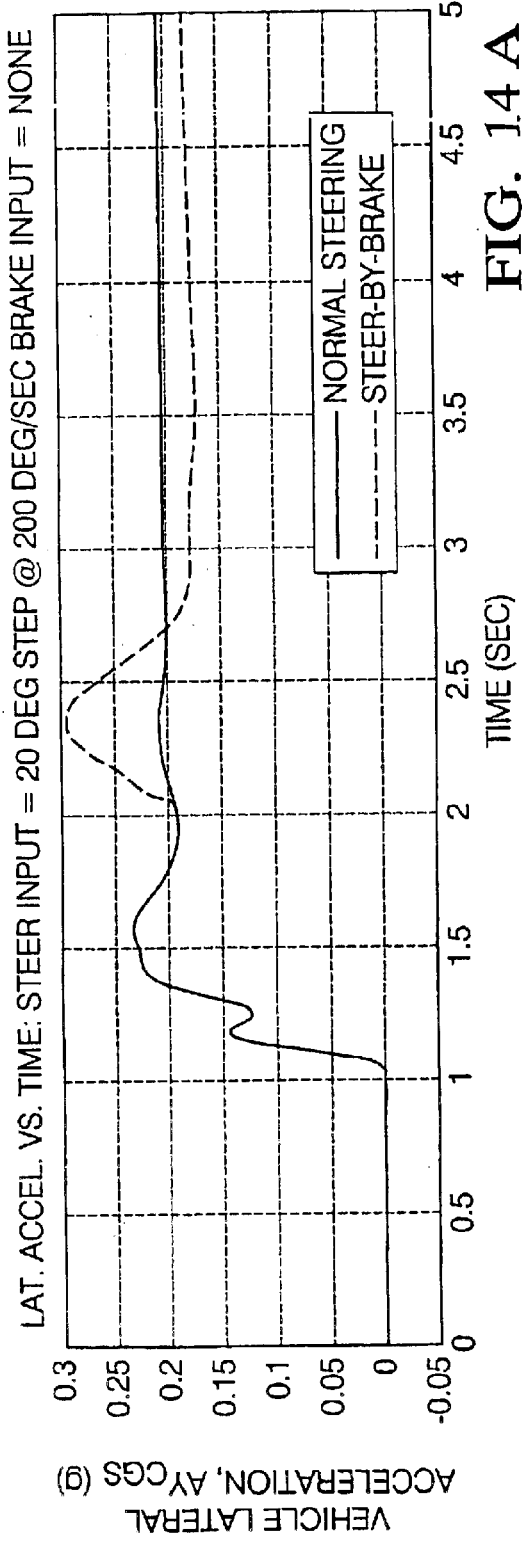
Figure 14:
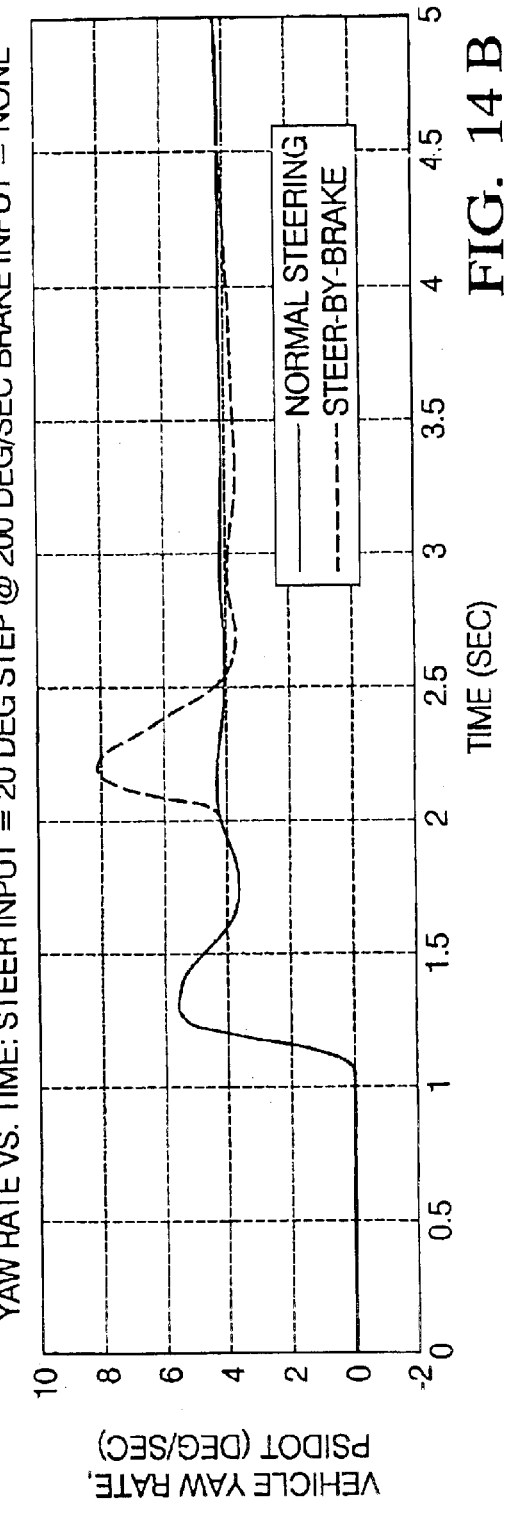

The previously discussed simulations each cover examples of where the steering system has failed prior to the maneuver being performed, such that steer-by-brake is in effect for the entire maneuver. However, there is also the possibility that the primary steering fails in the middle of a maneuver, and thus the transition must be made from normal steering to steer-by-brake. FIGS. 14(a) and (b) illustrate the results of such a transition from normal steering to steer-by-brake, without any special action to manage the transition to steer-by-brake following a steering system failure. The maneuver illustrated is a constant handwheel angle turn, wherein the driver inputs a pseudo-step input and holds the wheel in that position. The steer input begins at 1 second and, part way into the turn at t=2 seconds, the steering system fails and steer-by-brake begins.

Figure 15:
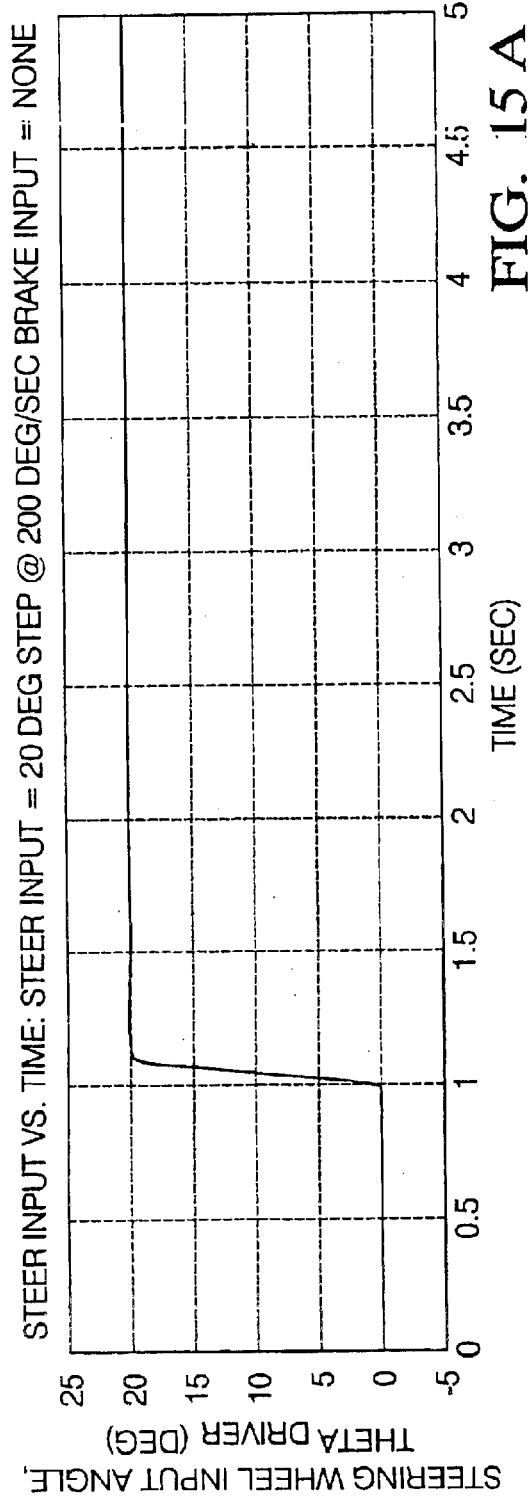
Figure 15:
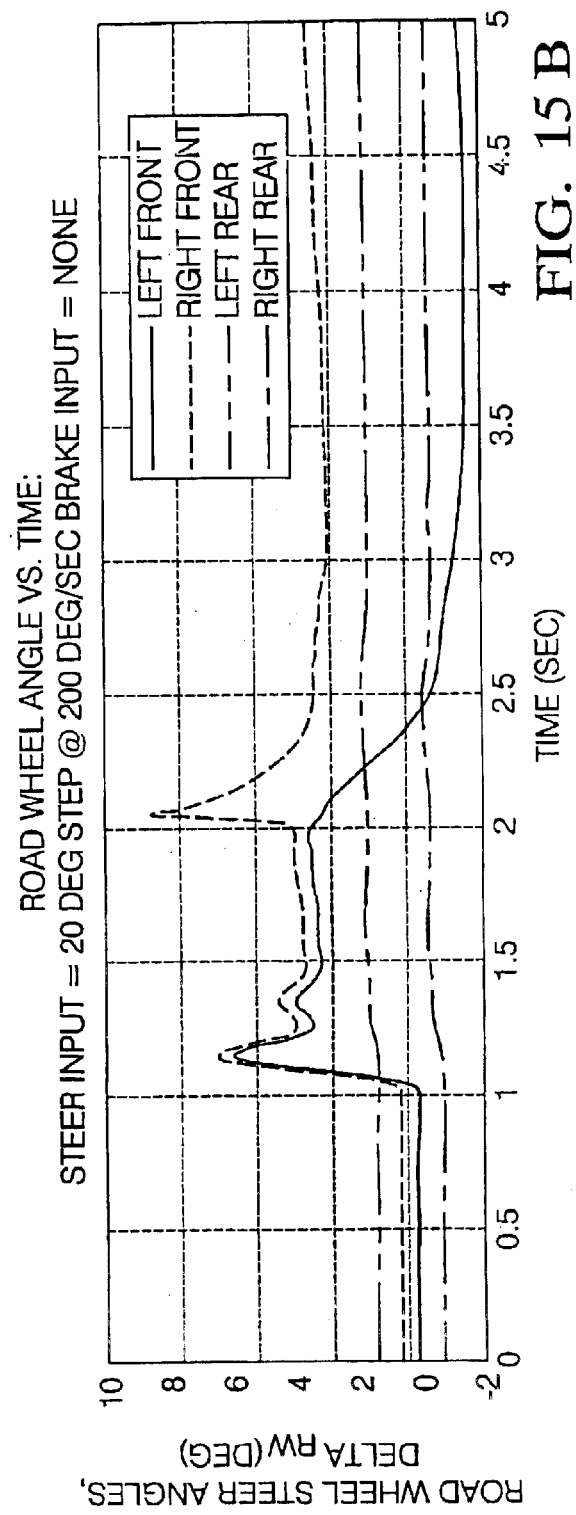

As can be seen from both FIGS. 14(a) and 14(b), the results demonstrate a fairly significant overshoot in lateral response immediately following the transition at t=2 seconds. This is due to the fact that the front wheels are operating at the angle needed to hold in the turn at the point in time when the failure occurs, as seen in FIGS. 15(a) and 15(b). Since steer-by-brake takes over immediately, a brake force is applied to the right front wheel causing a yaw moment on the vehicle and also initially increasing the steer angle of the right front wheel. The steer-by-brake algorithm was designed for the case where the front wheels start out straight ahead and are not producing any lateral force. In this instance, since the front wheels are still turned immediately following the failure, the combination of lateral force from the front tires being turned and the yaw moment caused by braking are too great. It is not until the front wheels have straightened out to their undriven position and the closed-loop yaw rate control has had time to adjust that the lateral response returns to the desired level.

Figure 16A:
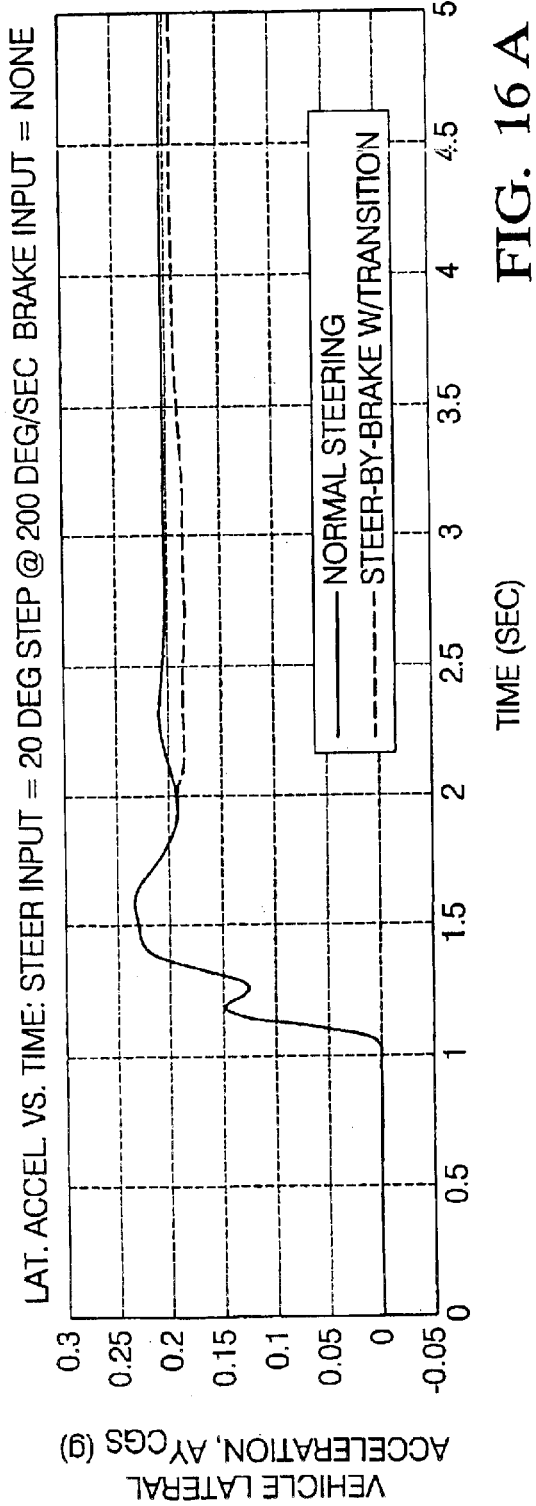
Figure 16B:
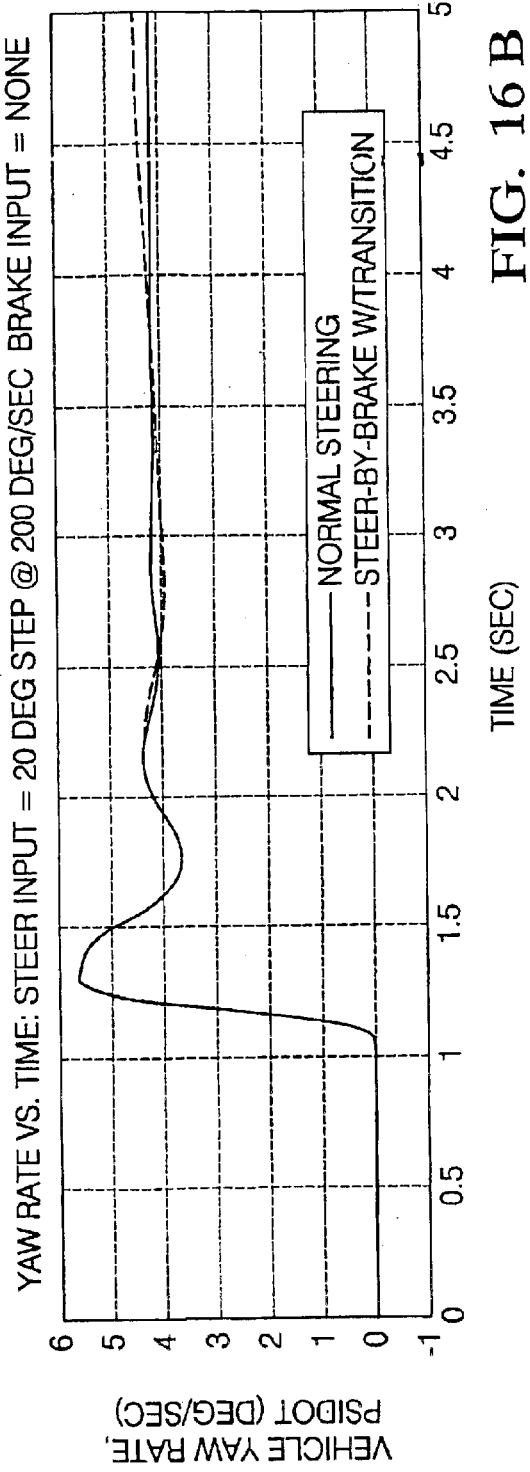

To address this issue during such a transition, an addition was made to the steer-by-brake algorithm to ramp in the brake application over an appropriate period of time to make the transition occur more smoothly (i.e., the filtered signal 216 shown in FIG. 2). As can be seen in FIG. 15(b), the steer angles of the front wheels return to their undriven positions with a response that roughly matches a first-order system. As such, by ramping up the output from the steer-by-brake algorithm using a first order lag with an appropriate time constant, the transition should occur smoothly. FIGS. 16(a) and 16(b) show the results of using such a ramp-up in response. As can be seen, the yaw rate response of the vehicle is virtually the same as the response with normal steering. The lateral acceleration response also matches very closely, with the difference being attributed to the deceleration caused by the steer-by-brake algorithm. In lieu of a first order lag, a linear ramp could also be used, however the linear ramp does not provide as smooth a transition as the first order lag.

Through the use of the above described system and method, the braking system of a motor vehicle may be used as a backup steering system in the event of a failure of the primary steering system. Although the present invention embodiments have been exemplified in the context of (and are particularly suited for) a steer-by-wire system, the principles discussed herein are equally as applicable to other steering systems as well. For example, the steer-by-brake system may be used in conjunction with an electronic power steering system, a hydraulic power steering system or a conventional steering system. In so doing, a lateral response on the order of 0.3 g can be achieved.

In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as a data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for implementing directional control of a motor vehicle, the method comprising:
    determining whether a failure of a primary steering system of the motor vehicle exists;
    if a failure of the primary steering system exists, then creating a yaw moment on the vehicle by causing a differential longitudinal force to be applied with respect to a first wheel on one side of the vehicle and a second wheel on an opposite side of the vehicle, thereby causing the vehicle to turn in a commanded direction; wherein said causing a differential longitudinal force further comprises applying a braking force to at least one of said first and second wheels of the vehicle;
    wherein said creating a yaw moment on the vehicle further comprises:
        determining a desired directional response,
        determining whether a desired braking operation exists, and
        generating a brake torque output signal, based upon said desired directional response and whether said desired braking operation exists, said brake torque output signal being used in said selectively applying a braking force;
    wherein said desired directional response is determined by a closed-loop yaw rate control mechanism, said closed-loop yaw rate control mechanism being implemented by:
        generating an error signal, said error signal representing the difference between a desired yaw rate and said vehicle yaw rate; and
        said desired yaw rate being determined from a steering wheel angle and a vehicle speed;
    wherein said desired yaw rate is further determined by:
        inputting said steering wheel angle and said vehicle speed into a lookup table, said lookup table thereby determining a desired steady state yaw rate; and
        filtering said desired steady state yaw rate through a second order filter.

2. A method for implementing directional control of a motor vehicle, the method comprising:
    determining whether a failure of a primary steering system of the motor vehicle exists;
    if a failure of the primary steering system exists, then creating a yaw moment on the vehicle by causing a differential longitudinal force to be applied with respect to a first wheel on one side of the vehicle and a second wheel on an opposite side of the vehicle, thereby causing the vehicle to turn in a commanded direction, wherein said causing a differential longitudinal force further comprises applying a braking force to at least one of said first and second wheels of the vehicle;
    wherein said creating a yaw moment on the vehicle further comprises:
        determining a desired directional response,
        determining whether a desired braking operation exists, and
        generating a brake torque output signal, based upon said desired directional response and whether said desired braking operation exists, said brake torque output signal being used in said selectively applying a braking force;
    wherein said desired directional response is determined by a closed-loop yaw rate control mechanism, said closed-loop yaw rate control mechanism being implemented by:
        generating an error signal, said error signal representing the difference between a desired yaw rate and said vehicle yaw rate; and
        said desired yaw rate being determined from a steering wheel angle and a vehicle speed; and
    using a feedforward term to generate an initial brake input component to said braking force, said feedforward term being a function of said vehicle speed.

3. A method for implementing directional control of a motor vehicle, the method comprising:
    determining whether a failure of a primary steering system of the motor vehicle exists;
    if a failure of the primary steering system exists, then creating a yaw moment on the vehicle by causing a differential longitudinal force to be applied with respect to a first wheel on one side of the vehicle and a second wheel on an opposite side of the vehicle, thereby causing the vehicle to turn in a commanded direction, wherein said causing a differential longitudinal force further comprises applying a braking force to at least one of said first and second wheels of the vehicle;
    wherein said creating a yaw moment on the vehicle further comprises:
        determining a desired directional response,
        determining whether a desired braking operation exists, and
        generating a brake torque output signal, based upon said desired directional response and whether said desired braking operation exists, said brake torque output signal being used in said selectively applying a braking force;
    configuring a switching mechanism for selectively switching between a first, a second and a third mode of operation;
    said first mode of operation corresponding to an operational status of the primary steering system;
    said second mode of operation corresponding to a failure of the primary steering system and a commanded directional control operation of the motor vehicle;
    said third mode of operation corresponding to a failure of the primary steering system and a combined directional control operation and a braking operation of the motor vehicle; and wherein said brake torque output signal is dependent upon which of said first, second and third modes of operation is selected by said switching mechanism.

4. The method of claim 3, wherein said switching mechanism is responsive to a braking mode output signal, said braking mode output signal determining which of said first, second and third modes is selected by said switching mechanism.

5. The method of claim 4, wherein:

said braking mode output signal is generated from a steer status signal, said steer status signal indicative of whether a primary steering system failure exists; and said braking mode output signal is further generated from a brake pedal input signal, said brake pedal input signal indicative of whether a braking operation of the motor vehicle has been commanded.

6. The method of claim 5, wherein in said third mode of operation, said brake torque output signal causes the braking force one of said first and second wheels to be increased by a given magnitude and the braking force on the other of said first and second wheels to be decreased by said given magnitude.

7. The method of claim 3, wherein said brake torque output signal is set to zero in said first mode of operation.

8. The method of claim 3, wherein said brake torque output signal is further multiplied by a filtered signal, said filtered signal being derived from said braking mode output signal, and said filtered signal providing a first order lag for transitioning between said first, second and third modes of operation.

* * * * *